Oct. 8, 1968 SEIJIRO MAEDA 3,405,292
MAGNETIC FLUX PATH SWITCHING DEVICE WHEREIN SUPERCONDUCTIVE SUBSTANCES ARE UTILIZED
Filed Feb. 19, 1965 4 Sheets-Sheet 1

INVENTOR.
Seijiro Maeda
BY
H. Edward Mestern

Oct. 8, 1968 SEIJIRO MAEDA 3,405,292

MAGNETIC FLUX PATH SWITCHING DEVICE WHEREIN SUPERCONDUCTIVE SUBSTANCES ARE UTILIZED

Filed Feb. 19, 1965 4 Sheets-Sheet 2

INVENTOR.
Seijiro Maeda

BY

H. Edward Mastery

INVENTOR.
Seijiro Maeda
BY
H. Edward Maslow

Oct. 8, 1968 SEIJIRO MAEDA 3,405,292

MAGNETIC FLUX PATH SWITCHING DEVICE WHEREIN SUPERCONDUCTIVE SUBSTANCES ARE UTILIZED

Filed Feb. 19, 1965 4 Sheets-Sheet 4

INVENTOR.
Seijiro Maeda

BY

H. Edward Western

United States Patent Office 3,405,292

Patented Oct. 8, 1968

3,405,292

MAGNETIC FLUX PATH SWITCHING DEVICE WHEREIN SUPERCONDUCTIVE SUBSTANCES ARE UTILIZED

Seijiro Maeda, Fuchu-shi, Tokyo-to, Japan, assignor to Kabushiki Kaisha Hitachi Seisakusho, Tokyo-to, Japan, a joint-stock company of Japan Filed Feb. 19, 1965, Ser. No. 433,852
Claims priority, application Japan, Feb. 21, 1964, 39/9,653
4 Claims. (Cl. 310—11)

ABSTRACT OF THE DISCLOSURE

A magnetic flux path device using superconductive substances provided with a pair of magnetic poles and a space and magnetic flux therebetween, a superconductive magnetic shield enclosing said space and flux, and superconductive substance members disposed within the space. Means are provided to controllably vary the superconductivity of the substance members and thus to vary the magnetic field, so that an alternating current is produced.

This invention relates to a new magnetic flux path switching device wherein superconductive substances are utilized. More specifically, it is a general object of the invention to provide a device wherein, by utilizing the perfect or nearly perfect diamagnetism of superconductive substances, the magnetic flux produced between a pair of static magnetic poles is caused to be applied periodically to an electromagnetic, i.e., an electrically conductive fluid or an air-core coil (or an iron-core coil), and alternating current is obtained from the electromagnetic fluid or the air-core coil (or iron-core coil).

As is known, when a superconductive substance is cooled to a temperature below its superconductivity transition temperature determined by the particular nature of the substance, it assumes a superconductive state of zero electrical resistance and exhibits perfect diamagnetism and perfect conductivity.

On one hand, when the conductivity of a conductor in an electric field E is denoted by $\sigma$, the current flowing through the conductor can be expressed by the following relationship.

$$S=\sigma\vec{E}$$

On the other hand, the electric field produced in the conductor by a magnetic induction (magnetic flux density) B may be expressed by the following relationship.

$$\text{rot}\,\vec{E}=-\frac{\delta\vec{B}}{\delta t}$$

Therefore, if the conductor is placed in a magnetic field of magnetic induction $\vec{B}$, an electromotive force will be induced in the conductor of the polarity to cause a current to flow in a direction to cancel the effect of the impressed magnetic induction $\vec{B}$. Consequently, the magnetic induction lines cannot pass through the conductor.

Moreover, when a superconductive substance cooled to an extremely low temperature is used for the above mentioned conductor, no shield surface current is consumed because of its perfect conductivity, and there is no change in the magnetic induction $\vec{B}$ within the superconductive substance. In other words, this means that, if the magnetic induction $\vec{B}$ within the superconductive substance is initially zero, the flux of magnetic induction lines of an external magnetic field applied to the substance cannot penetrate through the superconductive substance.

Furthermore, since a superconductive substance cooled to an extremely low temperature is diamagnetic because of the Meissner effect, as is known, it has the property of forcing out the magnetic induction of an external magnetic field applied thereto.

It is apparent, therefore, that by utilizing the above mentioned perfect conductivity and perfect diamagnetism and enclosing with a superconductive substance the magnetic induction lines formed in the gap between a pair of magnetic poles, it is possible to direct the magnetic flux in any desired direction without any magnetic flux loss whatsoever.

Furthermore, a superconductive substance has the property of changing its conductive state from the superconductive state to the normal conductive state when a magnetic field equal to or exceeding in strength the critical magnetic field determined by the nature of the substance, when a current equal to or exceeding its critical current is passed therethrough, or when it is heated to its transition temperature or higher temperature. Conversely, the superconductive substance has the property of returning from the normal conductive state to the superconductive state when the magnetic field, current, or temperature is changed around the corresponding critical points. Therefore, it is possible to cause a superconductive substance to change over between the superconductive and normal conductive states with the critical point as a transition point.

According to the present invention there is provided a magnetic flux path switching device wherein the above described characteristics of superconductive substances are utilized, and wherein, by enclosing with a superconductive substance the magnetic flux formed in the space between a pair of magnetic poles, controllably operating the magnetic path switching device thereby formed by the superconductive substance in the magnetic circuit, and thereby causing the magnetic flux to be applied periodically to an electrically conductive fluid or an air-core coil (or an iron-core coil), alternating current is derived from the fluid or air-core coil (or iron-core coil).

The nature and details of the invention will be more clearly apparent by reference to the following detailed description with respect to specific embodiments of the invention, when read in conjunction with the accompanying drawings in which like parts are designated by like reference characters, and in which:

FIGS. 1(*a*) and 1(*b*) comprise explanatory diagrams in sectional view showing one example of an embodiment of magnetic flux path switching device utilizing a superconductive substance according to the invention as applied to an electrically conductive fluid, wherein FIGS. 1(*a*) and 1(*b*) respectively show application of magnetic flux from alternatingly opposite directions periodically to the electrically conductive fluid;

Figure 1A:
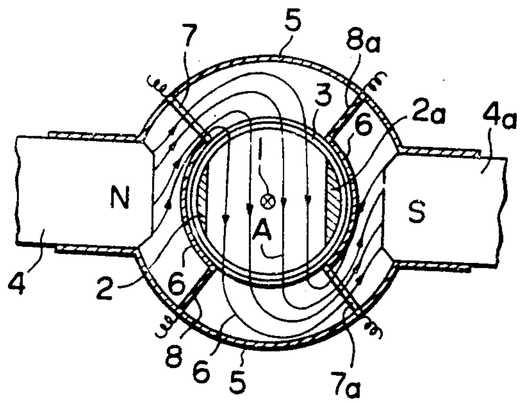
Figure 1B:
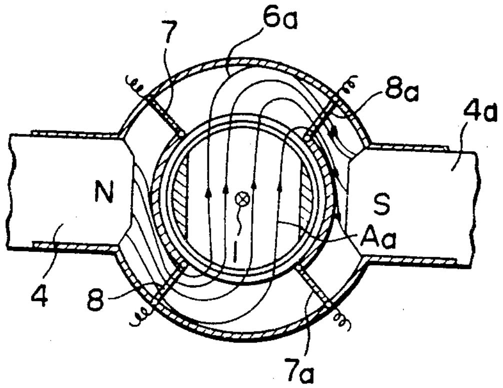
Figure 4A:
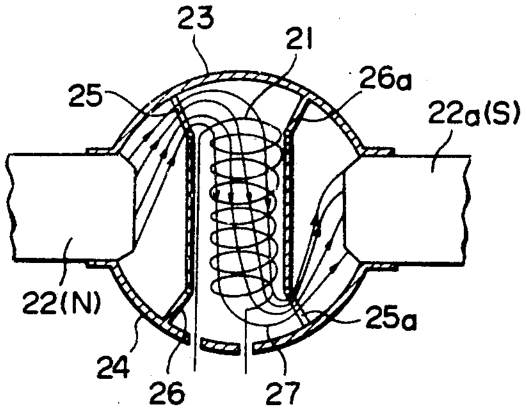
Figure 4B:
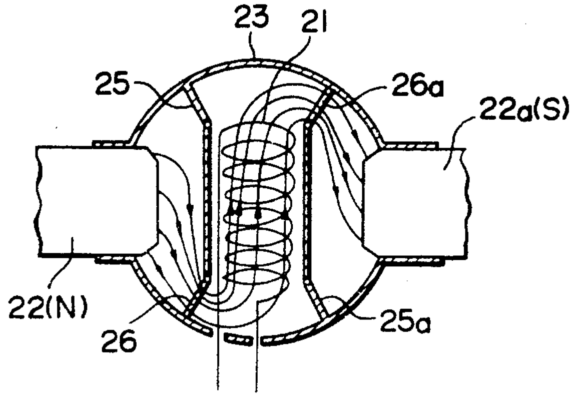
Figure 5:
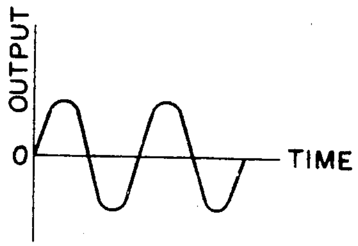
Figure 6A:
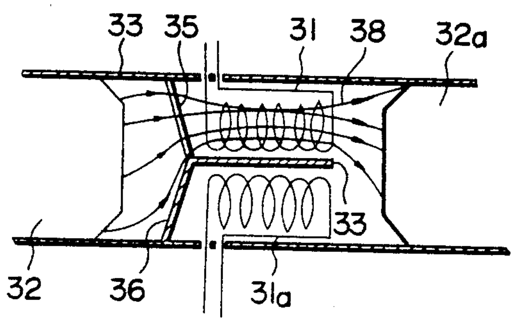
Figure 6B:
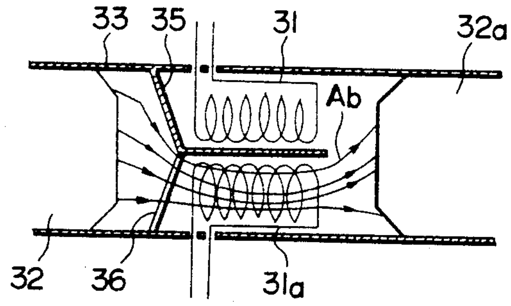

FIGS. 4(*a*) and 4(*b*) are explanatory diagrams in sectional view, similar to those in FIG. 1, showing another embodiment of the invention as applied to an air-core coil and respectively showing application of magnetic flux from alternatingly opposite directions periodically to the air-core coil;

FIG. 5 is a graphical representation showing a curve which indicates the characteristic relationship between electric output and time obtained by an A-C generator according to the invention; and FIGS. 6(*a*) and 6(*b*) are explanatory diagrams in sectional view showing a further embodiment of the invention wherein two air-core coils are arranged within magnetic flux paths, and alternating current is produced by a magnetic flux path switching device of a superconductive substance, and respectively indicating the manner in which the magnetic flux path passing through the air-core coils is switched by the switching device.

*Example 1*

In one embodiment of the invention as shown in FIGS. 1(*a*) and 1(*b*), there is provided a generating duct 3 provided with output terminals 2 and $\mathbf{2_a}$ and adapted to pass therethrough an electrically conductive fluid 1 perpendicularly to the plane of the drawing sheet (as denoted by the symbol ⊗). The duct 3 and the path of the fluid 1 are disposed in a space between a pair of magnets 4 (N pole) and $\mathbf{4_a}$ (S pole) for static magnetic field. When, with respect to the flow of the fluid 1, the space between the magnets is enclosed as indicated in FIG. 1(*a*) by means of plates 5, 6, 7, $\mathbf{7_a}$, 8, and $\mathbf{8_a}$ of a superconductive substance provided with cooling means (not shown), the magnetic flux between the magnet poles 4 and $\mathbf{4_a}$ is caused to assume a magnetic flux path as designated by reference character A.

That is, in order for the magnetic flux path A to be established, two pairs of plates made of a superconductive substance 7, $\mathbf{7_a}$, and 8, $\mathbf{8_a}$ must be adapted respectively to function periodically and alternately as superconductive magnetic shutters. In one example of construction for this purpose as shown in FIG. 2, a coil 9 for applying magnetic field to a superconductive plate (this coil being, of course, made of a superconductive substance) is arranged about the plate.

When, by means of this coil, a magnetic field of a strength equal to or exceeding the critical field, for example, of the superconductive plates 7 and $\mathbf{7_a}$, is applied to these plates, their superconductive state is changed to the normal conductive state, whereby the magnetic flux between the magnetic poles 4 and $\mathbf{4_a}$ is directed by this magnetic shutter effect to assume the form of the magnetic path A as shown in FIG. 1(*a*). Then, when the magnetic field applied to the superconductive plates 7 and $\mathbf{7_a}$ is lowered in strength below that of the critical magnetic field in the next period, the plates 7 and $\mathbf{7_a}$ are returned again to the superconductive state and do not permit the magnetic flux to pass.

On the other hand, when the strength of the magnetic field applied to the superconductive plates 8 and $\mathbf{8_a}$ is caused to equal or exceed that of the critical magnetic field, the superconductive state of these plates is changed to the normal conductive state, and the magnetic flux between the magnetic poles 4 and $\mathbf{4_a}$ is directed to assume the magnetic flux path $A_a$ as shown in FIG. 1(*b*). Consequently, alternating magnetic fields which are perpendicular to each other and of opposite directions are applied periodically to the electrically conductive fluid, and, therefore, an alternating current can be obtained from the output terminals 2 and $\mathbf{2_a}$.

Figure 2:
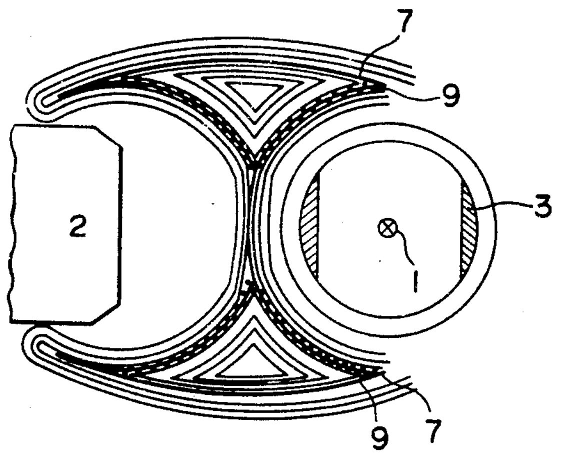
FIG. 2 is an enlarged view showing one part of the magnetic flux switching device of the invention.

If the coil 9 shown in FIG. 2 for applying a magnetic field to a superconductive plate is a unitary coil, the magnetic shutter will open fully and close fully in an instantaneous manner, whereby an alternating magnetic field of rectangular character will be obtained. However, by using a suitable number (six in the example illustrated in FIG. 3) of partial coils $C_1, C_2, C_3 \ldots C_n$ to form the coil and causing the currents flowing therethrough to be staggered in time, the alternating magnetic field applied to the electrically conductive fluid within the generating duct 3 can be caused to vary in a manner approaching that of a sinusoidal wave, whereby a sinusoidal alternating current as indicated in FIG. 5 can be obtained.

When the current passed through this coil for applying a magnetic field to a superconductive plate for a magnetic shutter for this magnetic flux changer is progressively increased, the magnetic field of the part of the plate corresponding to the coil center is initially the strongest. Accordingly, this part first assumes the normal conductive state, and, as the current is increased further, the other parts of the plate assume the normal conductive state. In order to cause this variation to occur sinusoidally, an adjusting coil for field control of suitable cofiguration can be used.

Figure 3:
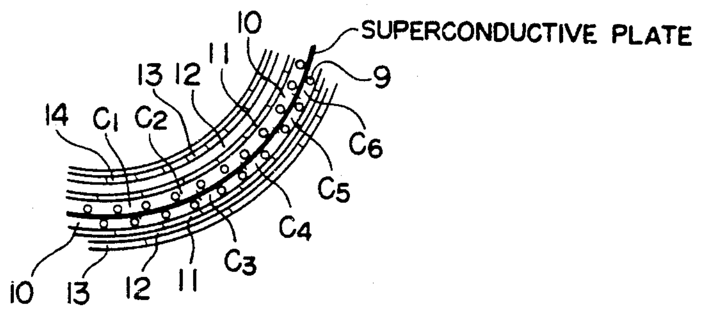
FIG. 3 is an enlarged view showing the construction of one part of a superconductive magnetic shutter device for the magnetic flux switching device according to the invention.

The superconductive plate of the above described superconductive magnetic shutter or superconductive substance must be maintained at an extremely low temperature and be thermally isolated from the outside. For this purpose the superconductive substance (and the coil 9 for applying the magnetic field) are enclosed within a liquid helium chamber 10, and on each side of this chamber 10, there are provided successively in laminate arrangement a vacuum shell 11, a liquid nitrogen chamber 12, and vacuum shell 13 as shown in FIG. 3, thereby to shield out outside heat.

In the above described embodiment of the invention, for the transition of the superconductive substance of the magnetic shutter devices 7, $\mathbf{7_a}$ and 8, $\mathbf{8_a}$ from the superconductive state to the normal conductive state or vice versa, the strength of the magnetic field applied to this substance is so increased and decreased that the critical magnetic field of the superconductive state of this superconductive substance becomes the transition point. However, it is evident that this transition can be caused also by increasing and decreasing the value of the current flowing through the superconductive substance or the value of the heating temperature with the critical value for maintaining the superconductive state as the transition point.

It is possible to cause the above described magnetic shutter operation also by mechanically opening and closing the superconductive substance within the magnetic path. However, it is very difficult to cause such mechanical opening and closing within a magnetic circuit having a low-temperature cooling system, for example, at 50 c.p.s.

Since by the present invention as described above, it is possible to apply an alternating magnetic field to an electrically conductive fluid by utilizing magnets for a static magnetic field, and since the magnetic field energy generated between these magnets, that is, the product of the square of the magnetic flux and the volume of the magnetic field space, is always constant, reactive power is not supplied. This is very convenient in comparison with the method of generating an alternating magnetic field with a coil. Furthermore, in comparison with methods such as that of rotating magnets of a static magnetic field about an electrically conductive fluid by mechanical means and the method of inserting and extracting a magnetic shielding device, the method of this invention entails much less danger and is much easier to reduce to practice.

*Example 2*

In a device for generating an alternating magnetic field in which device the superconductive substance mentioned in Example 1 is used, an air-core coil 21 is used as indicated in FIGS. 4(*a*) and 4(*b*) in place of the electrically conductive fluid used in the device of Example 1. Then, by a method similar to that of Example 1, the magnetic flux generated between static magnetic poles 22 and $\mathbf{22_a}$ is periodically applied alternately in opposite direction to the air-core coil 21 by the opening and closing of magnetic shutters 25, $\mathbf{25_a}$ and 26, $\mathbf{26_a}$, whereby alternating current can be generated.

*Example 3*

As shown in FIGS. 6(*a*) and 6(*b*), the space between magnets 32 and $\mathbf{32_a}$ for generating a static magnetic field is enclosed within a superconductive substance 33 similarly as in Examples 1 and 2, and in this enclosed space, there are further provided oppositely wound air-core coils 31 and $\mathbf{31_a}$ installed as shown. Moreover, the air-core coils 31 and $\mathbf{31_a}$ are shielded as shown by means of superconductive substance members 33, 35, and 36.

When the superconductive substance members 35 and 36 are caused alternately to change their states between the superconductive and normal conductive states similarly as in Examples 1 and 2, the flux path $A_b$ formed between the magnetic poles 32 and $\mathbf{32}_a$ is caused to change as indicated in FIGS. 4(*a*) and 4(*b*) by the magnetic shutter operation of the superconductive substance members 35 and 36, whose superconductive states are alternately changed to the normal conductive states. Consequently, the air-core coils 31 and $\mathbf{31}_a$ alternately produce induced voltage. Moreover, since the air-core coils 31 and $\mathbf{31}_a$ are wound in mutually opposite directions, an alternating current as indicated in FIG. 5 can be generated by suitably connecting these coils.

By using D-C exciting magnets instead of the magnets for establishing a magnetic field in the devices of Examples 1, 2, and 3, it is possible to use said devices as D.C.-A.C. inverters which do not require alternating magnetic field energy for generating A-C magnetic fields with magnets. Furthermore, if superconductive magnets are used for the magnets, the copper losses will be of negligibly low value.

The cooling device for cooling the above described superconductive substance parts requires a relatively low power supply for its operation. Moreover, this power is progressively approaching the theoretical value according to thermodynamics because of the present great progress in low-temperature technology. For example, if the power for cooling for a D.C.-A.C. inverter (or A-C generator) of 500,000 kw. rating is considered to be 5,000 kva., the overall efficiency of this D.C.-A.C. inverter will be 99 percent, which is considerably high.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What I claim is:

1. An alternating-current generating device utilizing an electrically conductive fluid, said device comprising a pair of magnetic poles disposed with a space and magnetic field therebetween, a superconductive, magnetic shield means formed to enclose said space and magnetic field, at least one pair of superconductive substance members disposed within said space, means to conduct a flow of an electromagnetic fluid through a specific part of said magnetic field, and means to vary controllably and periodically the superconductivity of said superconductive substance members thereby to vary periodically the magnetic field imparted to said electromagnetic fluid, and thereby to produce alternating current.

2. An alternating-current generating device comprising a pair of magnetic poles disposed with a space and magnetic field therebetween, a superconductive magnetic shield means formed to enclose said space and magnetic field, at least one pair of superconductive substance members disposed within said space, at least one coil disposed in a specific part of said magnetic field. and means to vary controllably and periodically the superconductivity of said superconductive substance members thereby to vary periodically the magnetic field imparted to said at least one coil, and thereby to produce alternating current in said at least one coil.

3. An alternating-current generating device comprising a pair of magnetic poles disposed with a space and magnetic flux therebetween, a superconductive magnetic shield means formed to enclose said space and magnetic flux, two interconnected coils wound in mutually opposite directions and disposed in different parts of said magnetic flux, magnetic shutter means made of a superconductive substance provided within said space and operating, upon being controlled, to shield off said magnetic flux alternately from one of said two coils, and means to control the superconductivity of said magnetic shutter means thereby to cause said magnetic shutter means to operate, and thereby to produce alternating current in said coils.

4. A magnetohydrodynamic generating device comprising: a pair of magnet poles; a superconductive magnetic shield means surrounding said pair of magnet poles and a space and magnetic field therebetween, superconductive substance members within said space, an electrically conductive fluid being caused to flow in a specific part of said space in a direction perpendicular to the magnetic field formed by said pair of magnet poles; and means for periodically switching superconductivity of at least a pair of said superconductive substance members.

References Cited

UNITED STATES PATENTS

| | | | |
|---|---|---|---|
| 3,098,189 | 7/1963 | Buchhold | 321—8 |
| 3,242,418 | 3/1966 | Mela et al. | 322—28 |
| 3,320,522 | 5/1967 | Arnold | 324—43 |

MILTON O. HIRSHFIELD, *Primary Examiner.*

DAVID X. SLINEY, *Assistant Examiner.*